US011093803B2

(12) United States Patent
Ahmed et al.

(10) Patent No.: US 11,093,803 B2
(45) Date of Patent: Aug. 17, 2021

(54) SCREENING TECHNIQUE FOR PROHIBITED OBJECTS AT SECURITY CHECKPOINTS

(71) Applicant: INTERNATIONAL BUSINESS MACHINES CORPORATION, Armonk, NY (US)

(72) Inventors: Mohamed Nooman Ahmed, Leesburg, VA (US); Samuel H. Woo, Reston, VA (US)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 16/441,270

(22) Filed: Jun. 14, 2019

(65) Prior Publication Data

US 2020/0394442 A1   Dec. 17, 2020

(51) Int. Cl.
*G06K 9/62* (2006.01)
*G06T 7/00* (2017.01)
*G06N 3/08* (2006.01)
*G06N 20/00* (2019.01)

(52) U.S. Cl.
CPC ............. *G06K 9/628* (2013.01); *G06N 3/08* (2013.01); *G06N 20/00* (2019.01); *G06T 7/0002* (2013.01); *G06T 2207/10008* (2013.01); *G06T 2207/20081* (2013.01); *G06T 2207/20084* (2013.01)

(58) Field of Classification Search
CPC .. G06K 9/3241; G06K 9/00771; G06K 9/628; G01N 23/04; G01V 5/0083; G06N 3/08; G06N 20/00; G06T 7/0002; G06T 2207/20081; G06T 2207/10008; G06T 2207/20084

USPC ........................................ 382/224; 378/57, 4
See application file for complete search history.

(56) References Cited

U.S. PATENT DOCUMENTS

| | | | |
|---|---|---|---|
| 6,026,171 A | 2/2000 | Hiraoglu et al. | |
| 9,996,890 B1 | 6/2018 | Cinnammon et al. | |
| 10,013,750 B2 | 7/2018 | Zhang et al. | |
| 10,014,076 B1 | 7/2018 | LaBorde | |
| 2009/0175411 A1* | 7/2009 | Gudmundson | G06K 9/3241 378/57 |
| 2017/0242148 A1 | 8/2017 | Yu et al. | |
| 2017/0365118 A1* | 12/2017 | Nurbegovic | G01V 5/0008 |

(Continued)

OTHER PUBLICATIONS

Anomalous Object detection in mm-wave imagery, IP.com Number: IPCOM000200693D, IP.com Electronic Publication Date: Oct. 25, 2010, copyright: HRL Laboratories, LLC, 6 pages.

(Continued)

*Primary Examiner* — Charlotte M Baker
(74) *Attorney, Agent, or Firm* — Schmeiser, Olsen & Watts, LLP; Christopher Pignato (57) ABSTRACT

A system and method for automatically classifying compartments at a security checkpoint includes receiving a three-dimensional representation of a compartment from an imaging device connected to the computing system, and classifying the compartment into a first category or a second category using a trained neural network that analyzes the three-dimensional representation, wherein compartments classified into the first category are automatically cleared at the security checkpoint and compartments classified into the second category undergo further security checks.

20 Claims, 9 Drawing Sheets

(56) References Cited

U.S. PATENT DOCUMENTS

2019/0244346 A1  8/2019  Schafer
2020/0320685 A1  10/2020  Anssari Moin

OTHER PUBLICATIONS

Method and system for airport baggage security checking with holographic object navigation, Authors: et. al.: Disclosed Anonymously, IP.com Number: IPCOM000246751D, IP.com Electronic Publication Date: Jun. 29, 2016, 3 pages.

Method and System for Interpreting Scanned Security Images using Cognitive Solutions, Authors: et. al.: Disclosed Anonymously, IP.com Number: IPCOM000255971D, IP.com Electronic Publication Date: Oct. 26, 2018, 3 pages.

Collaborative Mobile Device Enabled In-Baggage Suspicious Object Detection, Authors: et. al.: Disclosed Anonymously, IP.com Number: IPCOM000258674D, IP.com Electronic Publication Date: Jun. 3, 2019, 7 pages.

Flitton et al., Object Classification in 3D Baggage Security Computed Tomography Imagery using Visual Codebooks, Jan. 2015, 26 pages.

Mouton et al., A review of automated image understanding within 3D baggage computed tomography security screening, Article in Journal of X-Ray Science and Technology, Sep. 2015, 50 pages.

Allan Zelener, Survey of Object Classification in 3D Range Scans, 2017, 32 pages.

U.S. Appl. No. 16/441,334, filed Jun. 14, 2019, Conf. No. 1495.
U.S. Appl. No. 16/441,308, filed Jun. 14, 2019, Conf. No. 9836.

Prasoon et al. Deep Feature Learning for Knee Cartilage Segmentation Using a Triplanar Convolutional Neural Network, MICCAI 2013, Part II, LNCS 8150, pp. 246-353.

Office Action dated Apr. 15, 2021, U.S. Appl. No. 16/441,308, filed Jun. 14, 2019.

Notice of Allowance dated Apr. 19, 2021, U.S. Appl. No. 16/441,334.

Final Amendment dated Apr. 6, 2021, U.S. Appl. No. 16/441,334.

\* cited by examiner

SCREENING TECHNIQUE FOR PROHIBITED OBJECTS AT SECURITY CHECKPOINTS

STATEMENT REGARDING FEDERALLY SPONSORED RESEARCH OR DEVELOPMENT

This invention was made with government support under contract number HSTS04-17-C-CT7239 awarded by the Transportation Security Administration. The government has certain rights to this invention

TECHNICAL FIELD

The present invention relates to systems and methods for screening compartments for prohibited objects, and more specifically the embodiments of a classification system for automatically classifying compartments at a security checkpoint.

BACKGROUND

Security checkpoints for screening compartments, such as luggage, backpacks, and suitcases are located at almost all transportation hubs. The screening process must be thorough yet also allow for a high volume of travelers to pass through the security checkpoint without sacrificing a quality of the screening process

SUMMARY

An embodiment of the present invention relates to a method, and associated computer system and computer program product for automatically classifying compartments at a security checkpoint. A processor of a computing system receives a three-dimensional representation of a compartment from an imaging device connected to the computing system; and classifies the compartment into a first category or a second category using a trained neural network that analyzes the three-dimensional representation, wherein compartments classified into the first category are automatically cleared at the security checkpoint and compartments classified into the second category undergo further security checks.

DETAILED DESCRIPTION

In brief overview, security checkpoint locations at transportation hubs are designed to screen for prohibited items, such as explosives, sharps, weapons, and the like. To be allowed beyond a security checkpoint, travelers must allow security officials to scan or otherwise examine personal items, canyon bags, and other luggage. X-ray based technologies have been used for this purpose at security checkpoints for several decades. Items of interest, such as prohibited items, can be difficult to detect within this environment due to a range of orientation, clutter, and density confusion in a traditional two-dimensional (2D) X-ray projection. Specifically, the problem of objects occluding each other is a limitation of 2D X-ray scanners, which makes detection (automatically or by human operators) particularly challenging. For example, x-ray scanners take two images of an inside of a bag, which are displayed on a monitor for a security officer to inspect and visually determine whether the bag contains any prohibited items. X-ray technology at security checkpoints is limited because x-ray cannot penetrate certain objects that are often carried by travelers; some objects can obscure other objects.

Figure 1:
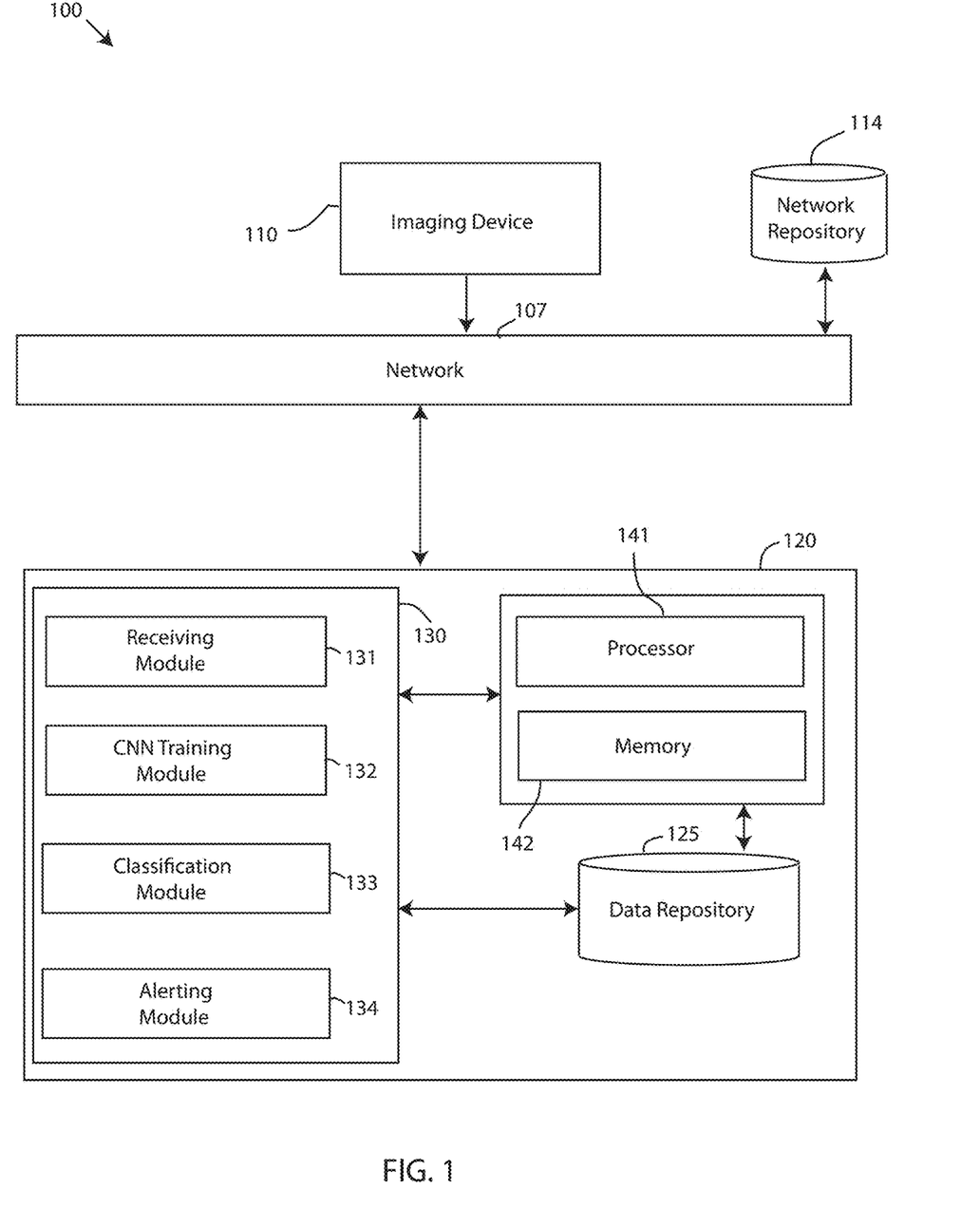
FIG. 1 depicts a block diagram of a classification system, in accordance with embodiments of the present invention.

To improve detection and passenger experience, embodiments of the present invention utilizes Computed Tomography (CT) technology instead of x-ray technology. CT technology can image a bag as a series of images packed together to form a three-dimensional rendering that can be viewed at multiple angles. Computer algorithms analyze the three-dimensional volume of data to automatically classify a bag has having or not having a prohibited item. Thus, instead of the security officer manually inspecting images on a monitor, which takes time and with varied results based on an experience level of the security officer, embodiments of the present invention automatically flag if there if a bag contains a prohibited item, and highlights on a monitor if a prohibited item is detected along with a confidence score. As a result, travelers can pass through security checkpoints much faster with a higher degree of safety and reliability Referring to the drawings, FIG. 1 depicts a block diagram of a classification system 100, in accordance with embodiments of the present invention. The classification system 100 is a system for automatically classifying compartments at a security checkpoint. The classification system 100 may be useful for fast screening procedures at airport security checkpoints. Embodiments of the classification system 100 may be alternatively referred to as a screening system, a luggage classification system, a security system, and the like.

The classification system 100 includes a computing system 120. Embodiments of the computing system 120 include a computer system, a computer, a server, one or more servers, a backend computing system, and the like.

Furthermore, the classification system 100 includes an imaging device 110 that is communicatively coupled to the computing system 120 over a network 107. For instance, information/data is transmitted to and/or received from the imaging device 110 over a network 107. In an exemplary embodiment, the network 107 is a cloud computing network. Further embodiments of network 107 refer to a group of two or more computer systems linked together. Network 107 includes any type of computer network known by individuals skilled in the art. Examples of network 107 include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. In one embodiment, the architecture of the network 107 is a peer-to-peer, wherein in another embodiment, the network 107 is organized as a client/server architecture.

In alternative embodiment, the imaging device 110 has a wired connection to the computing system 120 via one or more data bus lines. The data output by the imaging device 110 is transmitted to the computing system 120 by connecting the imaging device 110 to the computing system 120 via data bus lines to an I/O interface. An I/O interface refers to any communication process performed between the computer system 120 and the environment outside of the computer system 120, for example, the imaging device 110. Input to the computing system 120 refers to the signals or instructions sent to the computing system 120, for example the 3D volume data produced by the imaging device 110, while output may refer to the signals sent out from the computer system 120 to the imaging device 110.

In an exemplary embodiment, the network 107 further comprises, in addition to the computing system 120, a connection to one or more network-accessible knowledge bases 114, which are network repositories containing information relating to security policies, items permitted and not permitted, etc., network repositories or other systems connected to the network 107 that are considered nodes of the network 107. In an embodiment where the computing system 120 or network repositories allocate resources to be used by the other nodes of the network 107, the computing system 120 and network respository 114 is referred to as servers.

The network-accessible knowledge bases 114 is a data collection area on the network 107 which backs up and save all the data transmitted back and forth between the nodes of the network 107. For example, the network repository is a data center saving and cataloging the security policies, items permitted and not permitted, etc., and the like, to generate both historical and predictive reports regarding a particular screening technique. In an exemplary embodiment, a data collection center housing the network-accessible knowledge bases 114 includes an analytic module capable of analyzing each piece of data being stored by the network-accessible knowledge bases 114. Further, the computing system 120 can be integrated with or as a part of the data collection center housing the network-accessible knowledge bases 114. In an alternative embodiment, the network-accessible knowledge bases 114 are a local repository that is connected to the computing system 120.

Figure 2:
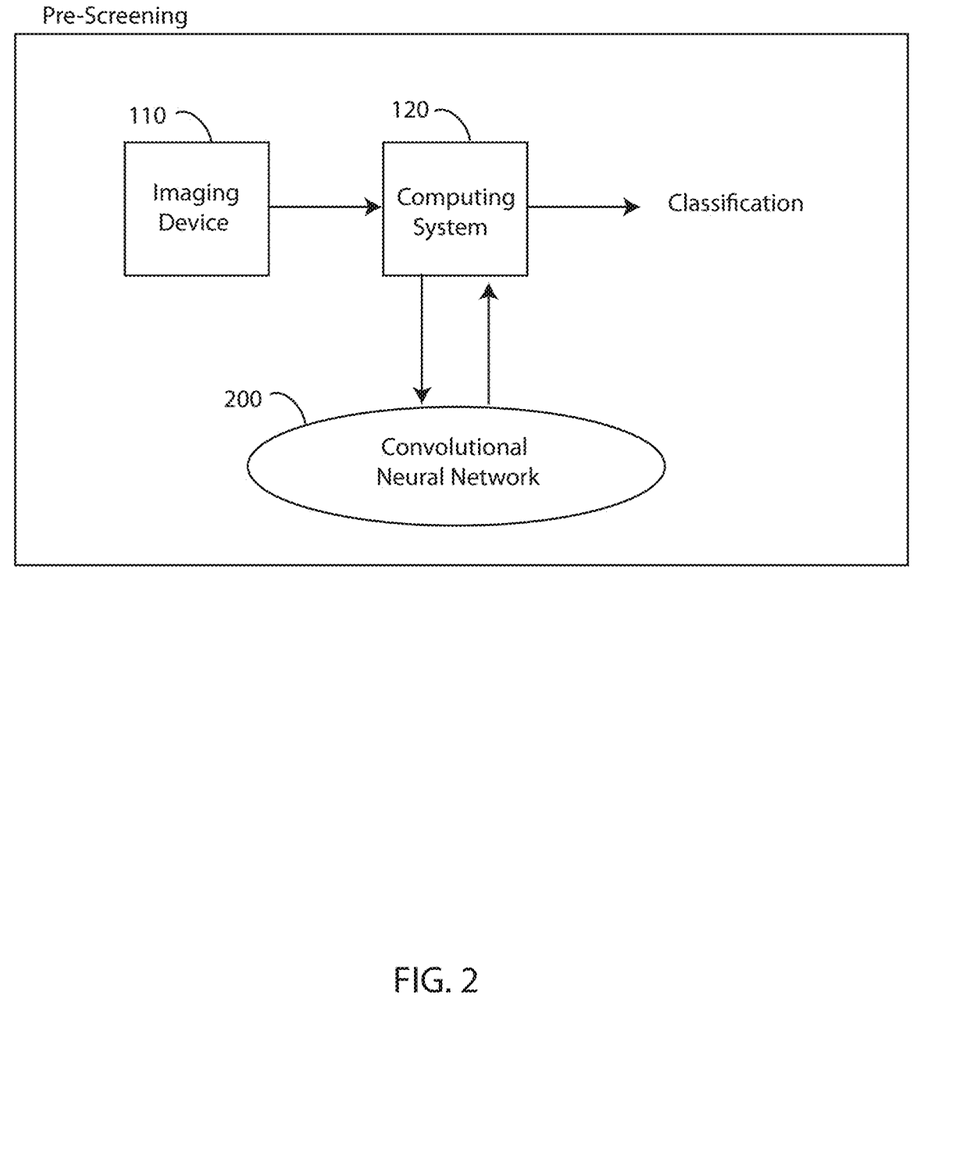
FIG. 2 depicts a block diagram of a pre-screening procedure at a security checkpoint, in accordance with embodiments of the present invention.

The imaging device 110 is a CT imaging device capable of scanning compartments, such as a bags, briefcases, suitcases, purses, computing devices, luggage, carryon bags, and the like. The imaging device 110 provides volumetric imagery that produce a three-dimensional (3D) "voxel" representation of the scanned compartments that are reconstructed. The imaging device 110 uses multiple energy bands in CT scanners for enhanced materials discrimination, and can achieve real time scanning rates for compartments in airport baggage/parcel handling operations. Further, the imaging device 110 produces a series of image slices through the compartment, which can be reconstructed as a traditional CT 3D volume, akin to those encountered within medical CT imaging. The imagine device 110 is physically located at the security checkpoint to receive compartments fed on a conveyor belt, for example. Other methods to insert the compartments into the imaging device 110 can be used, FIG. 2 depicts a block diagram of a pre-screening technique at a security checkpoint, in accordance with embodiments of the present invention. The pre-screening or screening technique includes the imaging device 110, the computing system 120, and a convolutional neural network (CNN) 200. The output of the screening technique is an automatic classification of a compartment into two categories. The two categories are a first category that represents compartments that do not include a prohibited object based on an output of the neural network 200, and a second category that represents compartments that do include a prohibited object based on the output of the neural network 200. The screening technique of FIG. 2 leverages deep learning techniques, which have emerged as a powerful alternative for supervised learning with great model capacity and the ability to learn highly discriminative features. In particular, CNNs are used to analyze the outputs from the imaging device 110 to provide an immediate classification of a compartment as a threat or no threat. The network topology of CNNs exploits the stationary nature of natural images by learning features using locally connected networks. Convolutional layers are used to learn small feature detectors based on patches randomly sampled from a large image, resulting in powerful object representations without the need to hand design features.

The screening technique classifies the compartments scanned by the imaging device 110 automatically and without regard to shape or material. For instance, the screening technique first scans the compartment with the imaging device 110 and then feeds the three-dimensional representation to a trained neural network 200 to output a classification of whether the scanned compartment contains a prohibited item or not. The automatic decision from the neural network 200 is quickly output from the neural network 200 and transmitted to the computing system 120. The computing system 120 can display a result on or more monitors visible to the security office and/or traveler. This quick classification regardless of shape or material of the prohibited item allows for faster movement through checkpoints as a very high percentage of compartments passing through security checkpoints do not include prohibited items. If a compartment is classified into the second category, a security officer is alerted, and further inspection of the compartment may take place. The screening technique of FIG. 2 is optionally used a pre-screening method for travelers' bags while another separate screening process for screening the travelers' persons is used.

Referring back to FIG. 1, the computing system 120 of the classification system 100 is equipped with a memory device 142 which stores various data/information/code, and a processor 141 for implementing the tasks associated with the classification system 100. A classification application 130 is loaded in the memory device 142 of the computing system 120. The classification application 130 can be an interface, an application, a program, a module, or a combination of modules. In an exemplary embodiment, the classification application 130 is a software application running on one or more back end servers (e.g. computing system 120), servicing the imagine device 110 and potentially linked security-operated computing devices, as well as communicating with the neural network 200.

The classification application 130 of the computing system 120 includes a receiving module 131, a CNN training module 132, a classification module 133, and an alerting module 134. A "module" refers to a hardware-based module, a software-based module, or a module that is a combination of hardware and software. Hardware-based modules include self-contained components such as chipsets, specialized circuitry and one or more memory devices, while a software-based module is a part of a program code or linked to the program code containing specific programmed instructions, which is loaded in the memory device of the computing system 120. A module (whether hardware, software, or a combination thereof) is designed to implement or execute one or more particular functions or routines.

The receiving module 131 includes one or more components of hardware and/or software program code for receiving a three-dimensional representation of a compartment from an imaging device 110 connected to the computing system 120. For instance, the volume data generated by the imaging device 110 as a function of the scanning of a compartment is transmitted to the computing system 120 for analysis and classification. The receiving module 131 receives the 3D volume representation of the scanned compartment and prepares the data for feeding into a trained neural network, such as CNN 200 shown in FIG. 2. The volumetric representation is a set or series of images in sequence of the interior region of the compartment, output by the imaging device 110, such as a computed topography (CT) scanner. Each image in the set of images has a width and a height, and when stacked together, form a depth. In response to receiving the 3D volume representation data from the imaging device 110, the receiving module 131 transmits the 3D volume representation data to the trained neural network.

The CNN training module 132 includes one or more components of hardware and/or software program code for training and updating the neural network 200 so that the neural network 200 can detect a presence of a prohibited item within a scanned compartment and learn over time. The CNN training module 132 uses a multi-step procedure to train the neural network. For instance, the CNN training module 132 trains and updates the neural network 200 by calculating a maximum intensity projection across each dimension of at least two orthogonal projections of a known three-dimensional representation of a prohibited object. Volume data for known prohibited items are utilized by the CNN training module 132 to train the neural network. For example, the 3D volume representation data of a first known prohibited object or item is fed into the neural network 200. The neural network calculates a maximum intensity projection across each dimension of at least two orthogonal projections of the series of images produced by the imaging device 110, stacks the maximum intensity projections into a single 2D image, and feeds the single 2D image into the trained neural network 200 so that the trained neural network 200 learns that the single image having the same maximum intensity projections corresponds to the first prohibited object. The process is repeated over time with the same prohibited object and with a second prohibited object, third prohibited object, and so on until the neural network 200 is trained and contains significant training data.

Figure 3:
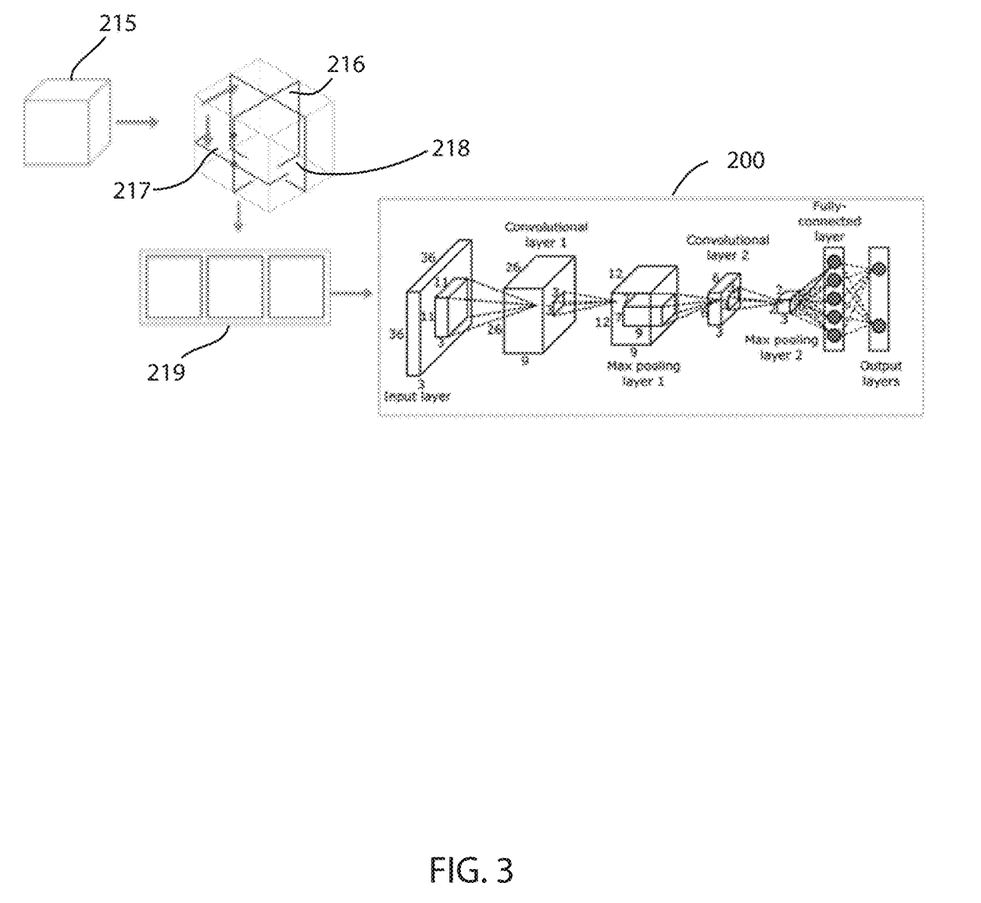
FIG. 3 depicts a system overview of the training of a neural network, in accordance with embodiments of the present invention.

A more detailed description of the neural network training will now be described with respect to FIG. 3, which depicts a system overview of the training of a neural network 200, in accordance with embodiments of the present invention. The volume 215 of the compartment is provided by the imaging device 110. The CNN training module 132 extracts at least two orthogonal projections or planes from the volume 215 but may extract three or more orthogonal projections. The more orthogonal projections extracted from the volume 215 requires additional processing and computational power; thus, in the interests of speed, three orthogonal projections may be suitable for the screening process described herein. FIG. 3 depicts three orthogonal projections being extracted from the volume 215, in particular projection 216 along the X, Y plane, projection 217 along X, Z plane, and projection 218 along Y, Z plane. The orthogonal projections 216, 217, 218 are opened by computing the maximum intensity projection across a certain dimension. The CNN training module 132 produces one flat plane by taking a maximum value of every pixel in the 2D plane (e.g. X, Y plane) across the third dimension (e.g. Z dimension). By way of example, for each pixel of the orthogonal projections 216, 217, 218, the maximum intensity projection across each dimension is calculated by determining: (i) a maximum value of a projection in a Z dimension along an X, Y plane of the at least two orthogonal projections, (ii) a maximum value of a projection in a Y dimension along a X, Z plane of the at least two orthogonal projections, and (iii) a maximum value of a projection in an X dimension along a Y, Z plane of the at least two orthogonal projections. The result of calculating the maximum intensity projections of the three orthogonal projections 216, 217, 218 are three 2D images called orthogonal maximum intensity projections. The orthogonal maximum intensity projections are stacked next to each other, as shown at 219. The stacked images 219 include a first projection next to the second projection next to the third projection. The CNN training module 132 then uses the stacked images 219 to train the neural network 200 by passing the stacked images 219 through the neural network 200 and obtaining the training data. The neural network 200 includes an input layer, a first convolutional layer, a first max pooling layer, a second convolutional layer, a second max pooling layer, a fully connected layer, and an output layer. In an exemplary embodiment, the neural network 200 is a two-dimensional CNN.

Referring back to FIG. 1, the classification module 133 includes one or more components of hardware and/or software program code for classifying the compartment into a first category or a second category using the trained neural network 200 that analyzes the three-dimensional representation produced by the imaging device 110. For instance, the classification module 133 transforms the three-dimensional representation of the scanned compartment received from the imaging device 110 into maximum intensity orthogonal 2D planes (i.e. stacked images) and feeds the stacked 2D images into the trained neural network 200 of the classification system 100. Because the neural network 200 has been trained using volume data from known prohibited items/objects, the classification module 133 leverages the neural network 200 to determine automatically whether the scanned compartment includes volume data known to correspond with prohibited objects for immediate categorization and screening. The classification module 133 labels the data based on the training data comprised by the neural network 200 so that the computing system 120 can determine that the compartment does or does not contain a prohibited object. The label may be threat or no threat. In an exemplary embodiment, the classification module 133 simply decides whether or not the compartment contains a prohibited object, and not a precise location within the compartment, or exactly what type of prohibited object is located within the compartment. In this way, the decision to clear a traveler or a traveler's compartment can be completed much sooner, especially given the high percentage of compartments that do not contain a prohibited object. The operator of the security checkpoint may decide that the initial classification into the first and second category acts a first leg of the checkpoint that moves very quickly with highly reliable determinations, and only compartments initially determined to contain a prohibited object move on to the second leg of the security checkpoint, at least with respect to the compartments.

By way of example, the trained neural network 200 classifies the compartment into the first category in response to determining that a single stacked image fed to the trained neural network calculated by the computing system from the three-dimensional representation of the compartment being scanned at the security checkpoint does not compare to previously classified single stacked images of known prohibited objects known by the trained neural network. Conversely, the trained neural network 200 classifies the compartment into the second category in response to determining that a single stacked image fed to the trained neural network 200 calculated by the computing system 120 from the three-dimensional representation of the compartment being scanned at the security checkpoint compares to previously classified single images of known prohibited objects known by the trained neural network 200. Accordingly, compartments classified into the first category are automatically cleared at the security checkpoint and compartments classified into the second category undergo further security checks, thereby streamlining at least a first stage of a screening process at a security checkpoint.

The alerting module 134 includes one or more components of hardware and/or software program code for alerting or otherwise displaying the classification determination made by the computing system 120. The classification may be output to one or more computing devices operated by the security officers and/or computers or monitors located at the security checkpoint. The alert or notification to the security offer is optionally discrete.

Various tasks and specific functions of the modules of the computing system 120 may be performed by additional modules, or may be combined into other module(s) to reduce the number of modules. Further, an embodiment of the computer or computer system 120 comprises specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry includes proprietary specially designed components (e.g., a specialized integrated circuit, such as for example an Application Specific Integrated Circuit (ASIC), designed for only implementing methods of the present invention).

Furthermore, the classification system 100 improves security technology by increasing the visibility of compartments being scanned by imaging devices and providing automated determinations of whether a piece of luggage contains a prohibited item. Deep learning and CNNs provide image recognition automation to solve a particular important and technical problem of quickly detecting a presence of a prohibited item inside a compartment. The classification system 100 provides a technical solution by classifying 3D volumetric representations of compartments scanned at a security checkpoint into two categories, regardless of shape and material, and without relying on manual visual inspection.

Figure 4:
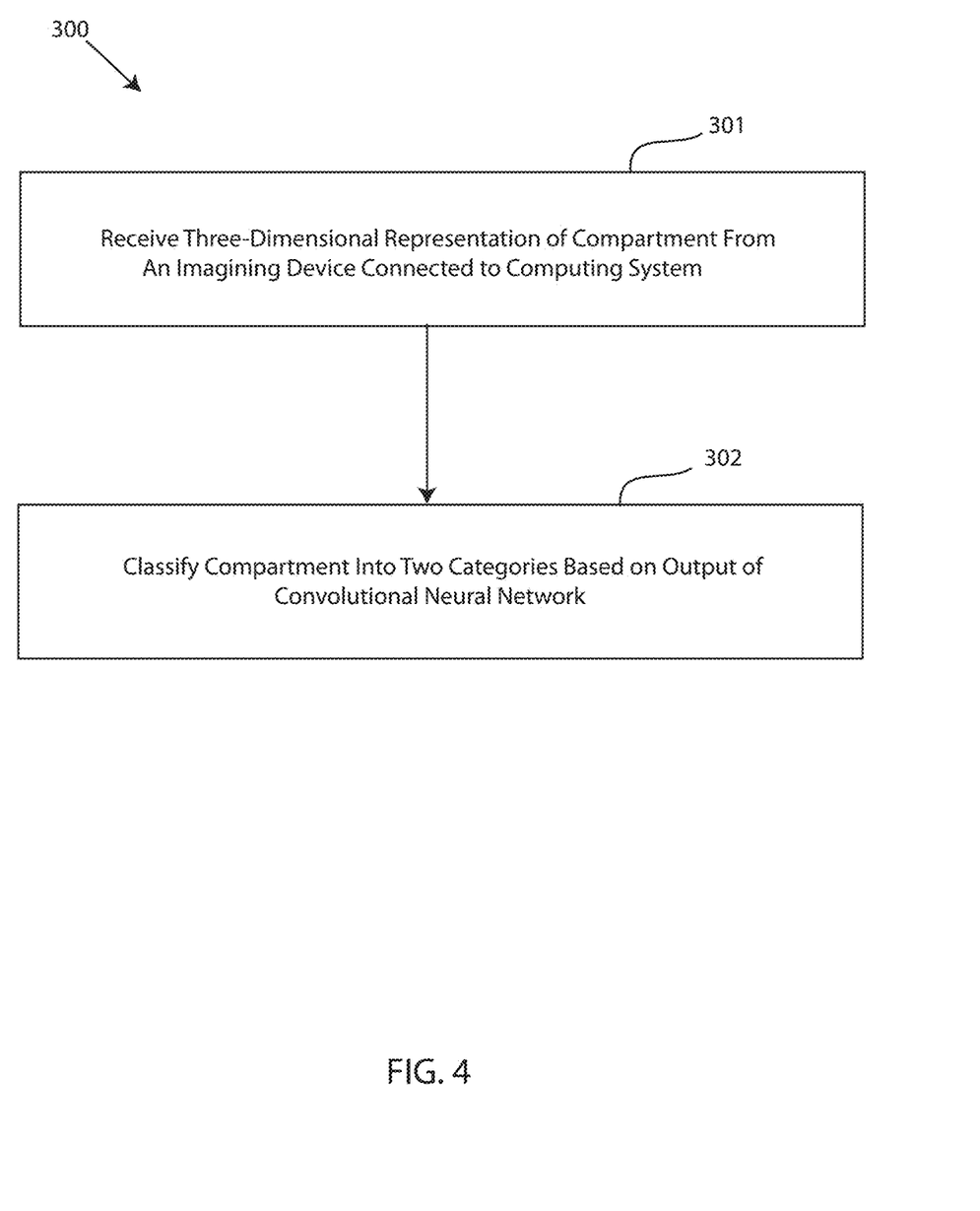
FIG. 4 depicts a flow chart of a method for automatically classifying compartments at a security checkpoint, in accordance with embodiments of the present invention.

Referring now to FIG. 4, which depicts a flow chart of a method 300 for automatically classifying compartments at a security checkpoint, in accordance with embodiments of the present invention. One embodiment of a method 300 or algorithm that may be implemented for automatically classifying compartments at a security checkpoint with the classification system 100 described in FIGS. 1-3 using one or more computer systems as defined generically in FIG. 7 below, and more specifically by the specific embodiments of FIG. 1.

Embodiments of the method 300 for automatically classifying compartments at a security checkpoint, in accordance with embodiments of the present invention, may begin at step 301 wherein step 301 receives a three-dimensional representation of a scanned compartment from an imaging device connected to the computing system. Step 302 classifies the scanned compartment into two categories based on an output of a convolutional neural network.

Figure 5:
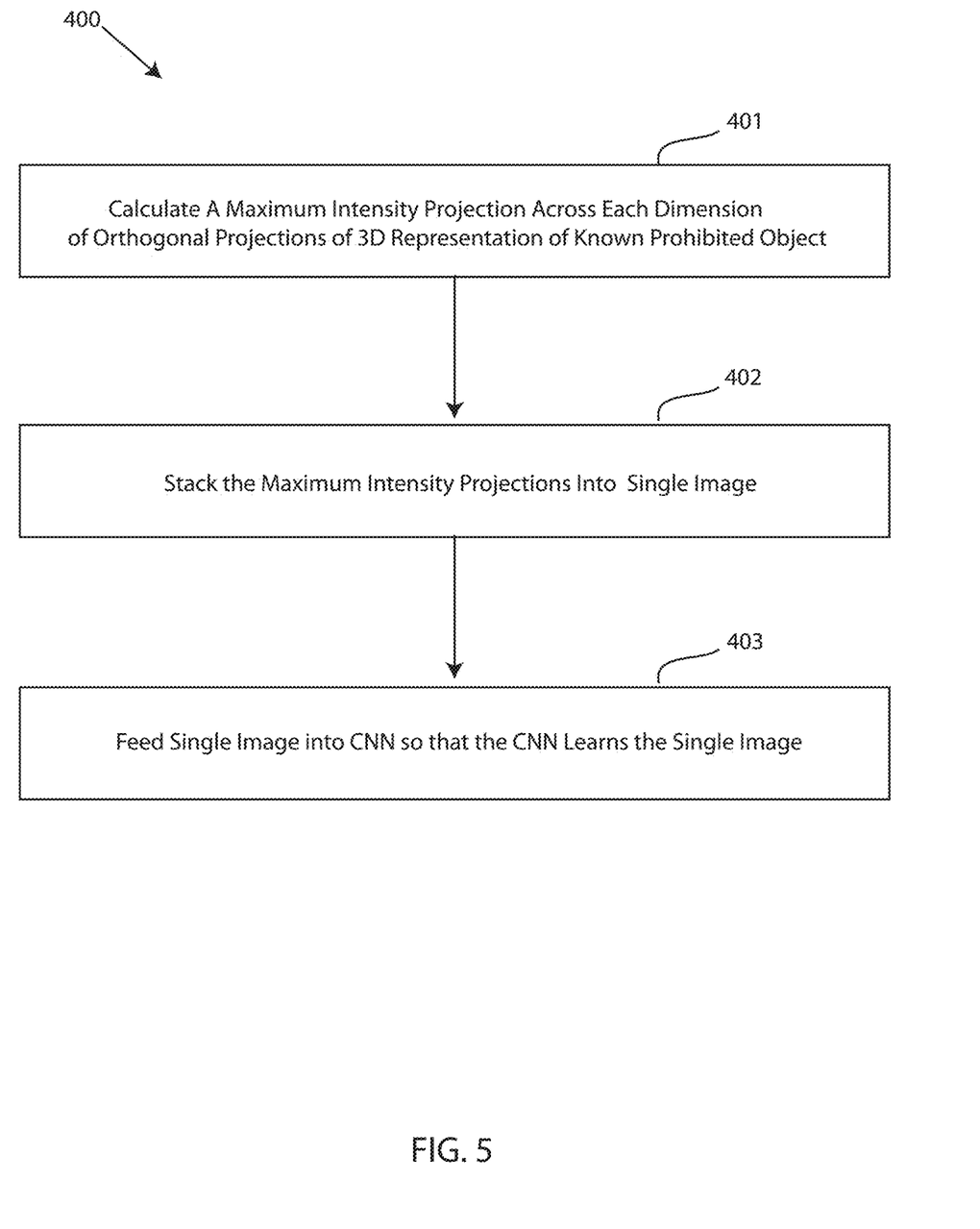
FIG. 5 depicts a flow chart for training a neural network, in accordance with embodiments of the present invention.

FIG. 5 depicts a flow chart of a method 400 for training a neural network, in accordance with embodiments of the present invention. Step 401 calculates a maximum intensity projection across each dimension of the orthogonal projections of the three-dimension representation of a known prohibited object. Step 402 stacks the maximum intensity projections into a single image. Step 403 feeds the stacked image into the convolutional neural network so that the convolutional neural network learns the stacked image.

Figure 6:
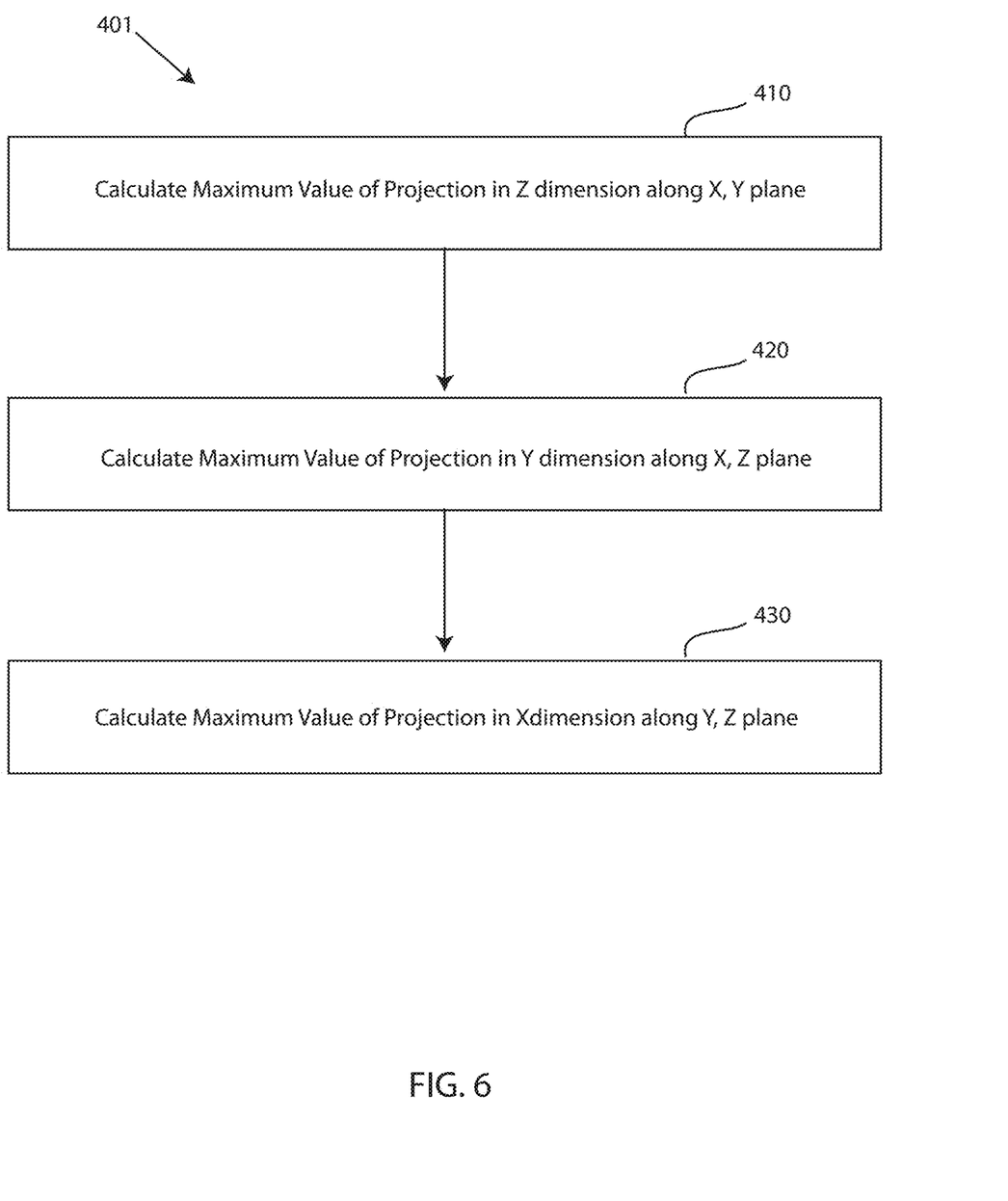
FIG. 6 depicts a flow chart of a step of the method of FIG. 5, in accordance with embodiments of the present invention.

FIG. 6 depicts a flow chart of a step 401 of the method 400 of FIG. 5, in accordance with embodiments of the present invention. Calculating a maximum intensity projection across each dimension of the orthogonal projections of the three-dimension representation of a known prohibited object is accomplished by steps 410, 420, 430. Step 410 calculates a maximum value of a projection for every pixel of the orthogonal projection in a Z dimension along the X, Y plane. Step 420 calculates a maximum value of a projection for every pixel of the orthogonal projection in a Y dimension along the X, Z plane. Step 430 calculates a maximum value of a projection for every pixel of the orthogonal projection in a X dimension along the Y, Z plane.

Figure 7:
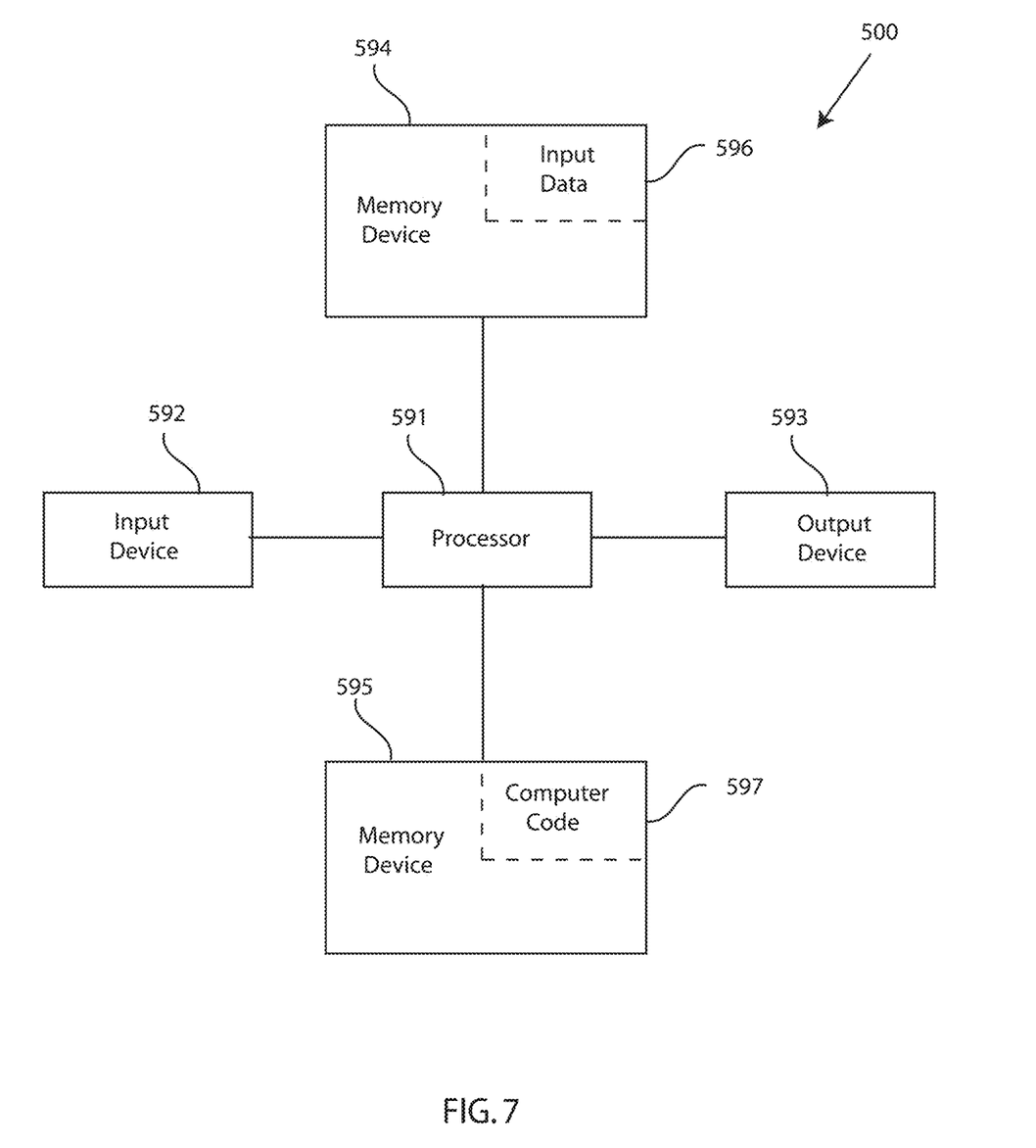
FIG. 7 depicts a block diagram of a computer system for classification system of FIGS. 1-3, capable of implementing a method for automatically classifying compartments at a security checkpoint of FIGS. 4-6, in accordance with embodiments of the present invention.

FIG. 7 depicts a block diagram of a computer system for the classification system 100 of FIGS. 1-3, capable of implementing methods for automatically classifying compartments at a security checkpoint of FIGS. 4-6, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for automatically classifying compartments at a security checkpoint in the manner prescribed by the embodiments of FIGS. 4-6 using the classification system 100 of FIGS. 1-3, wherein the instructions of the computer code 597 may be executed by processor 591 via memory device 595. The computer code 597 may include software or program instructions that may implement one or more algorithms for implementing the method for automatically classifying compartments at a security checkpoint, as described in detail above. The processor 591 executes the computer code 597. Processor 591 may include a single processing unit, or may be distributed across one or more processing units in one or more locations on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 7.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer system 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to automatically classifying compartments at a security checkpoint. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to automatically classify compartments at a security checkpoint. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a for using augmented reality for assisting speech development of multiple languages. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for automatically classifying compartments at a security checkpoint.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing, device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location as a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
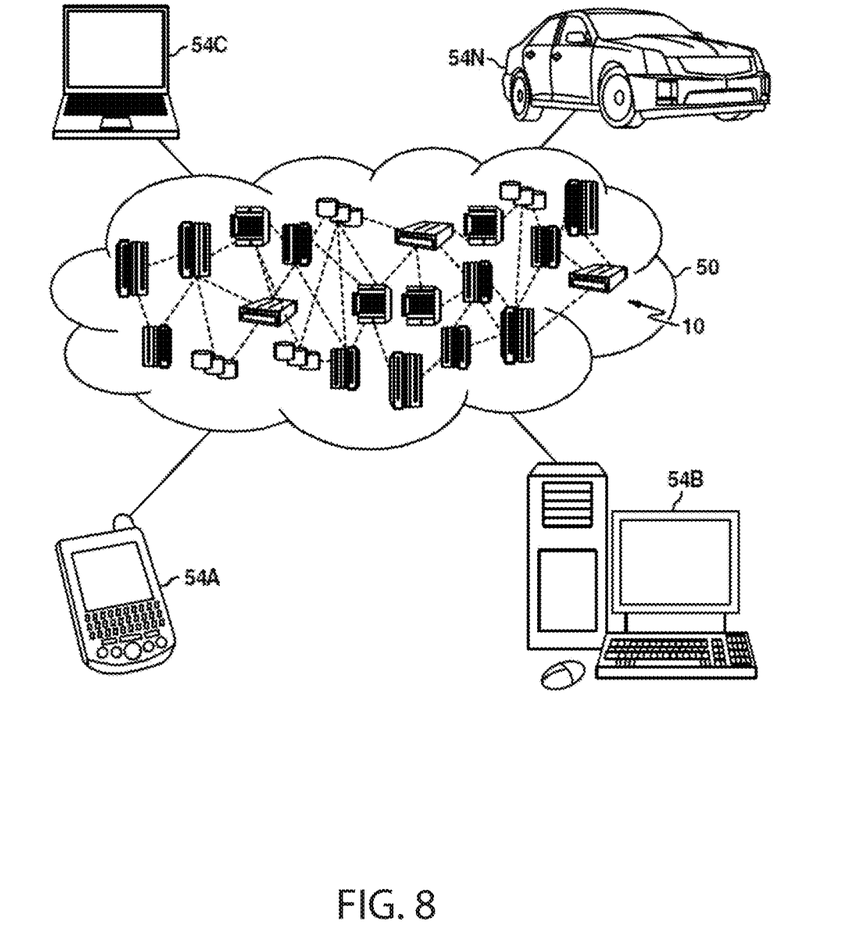
FIG. 8 depicts a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
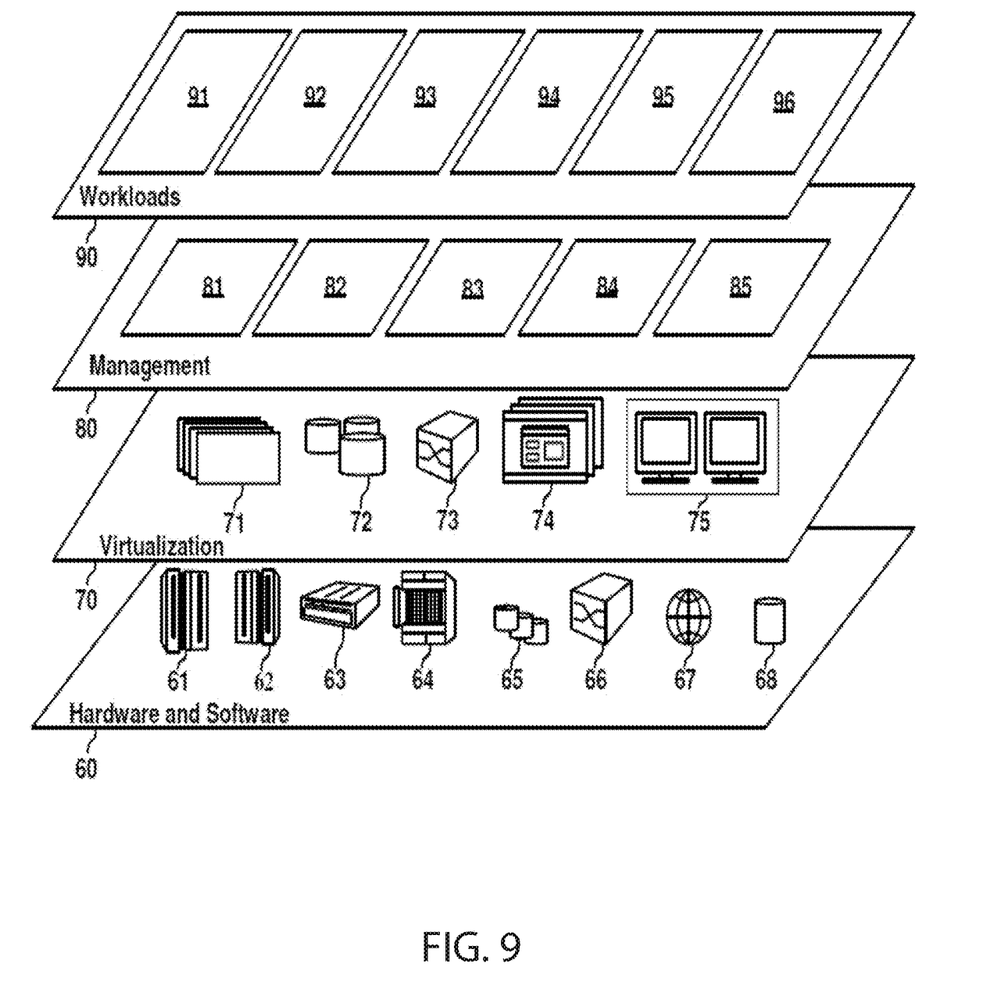
FIG. 9 depicts abstraction model layers, in accordance with embodiments of the present invention.

Referring now to FIG. 9, a set of functional abstraction layers provided by cloud computing environment 50 (see FIG. 8) are shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI and classification 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically classifying compartments at a security checkpoint, comprising:
   receiving, by a processor of a computing system, a three-dimensional representation of a compartment from an imaging device connected to the computing system; and
   classifying, by the processor, the compartment into a first category or a second category using a trained neural network that analyzes the three-dimensional representation, regardless of a shape or a material of an object contained within the compartment, without requiring human inspection of an output of the imaging device, wherein compartments classified into the first category are automatically cleared at the security checkpoint and compartments classified into the second category undergo further security checks.

2. The method of claim 1, wherein the three-dimensional representation is a set of images in sequence of the interior region of the compartment, output by a computed tomography (CT) scanner, further wherein each image in the set of images has a width and a height, and when stacked together, form a depth.

3. The method of claim 1, wherein the trained neural network is trained by:
   calculating, by the processor, a maximum intensity projection across each dimension of at least two orthogonal projections of a known three-dimensional representation of a prohibited object;
   stacking, by the processor, each of the maximum intensity projections into a single image; and
   feeding, by the processor, the single image into the trained neural network so that the trained neural network learns that the single image having the same maximum intensity projections corresponds to the prohibited object.

4. The method of claim 3, wherein the trained neural network classifies the compartment into the first category in response to determining that a single image fed to the trained neural network calculated by the computing system from the three-dimensional representation of the compartment being scanned at the security checkpoint does not compare to previously classified single images of known prohibited objects known by the trained neural network.

5. The method of claim 3, wherein the trained neural network classifies the compartment into the second category in response to determining that a single image fed to the trained neural network calculated by the computing system from the three-dimensional representation of the compartment being scanned at the security checkpoint compares to previously classified single images of known prohibited objects known by the trained neural network.

6. The method of claim 3, wherein the calculating the maximum intensity projection across each dimension of at least two orthogonal projections of the three-dimensional representation includes:
   first calculating, by the processor, a maximum value of a projection in a Z dimension along an X, Y plane of the at least two orthogonal projections, for each pixel;
   second calculating, by the processor, a maximum value of a projection in a Y dimension along a X, Z plane of the at least two orthogonal projections, for each pixel; and
   third calculating, by the processor, a maximum value of a projection in an X dimension along a Y, Z plane of the at least two orthogonal projections, for each pixel.

7. The method of claim 1, wherein the trained neural network is a two-dimensional convolutional neural network (CNN) that classifies the compartment into the first category or the second category.

8. The method of claim 1, wherein the first category represents compartments that do not include a prohibited object based on an output of the trained neural network, and the second category represents compartments that do include a prohibited object based on the output of the trained neural network.

9. A computing system, comprising:
   a processor;
   a memory device coupled to the processor; and
   a computer readable storage device coupled to the processor, wherein the storage device contains program code executable by the processor via the memory device to implement a method for using augmented reality for automatically classifying compartments at a security checkpoint comprising:
   receiving, by a processor of a computing system, a three-dimensional representation of a compartment from an imaging device connected to the computing system; and
   classifying, by the processor, the compartment into a first category or a second category using a trained neural network that analyzes the three-dimensional representation, wherein compartments classified into the first category are automatically cleared at the security checkpoint and compartments classified into the second category undergo further security checks.

10. The computing system of claim 9, wherein the three-dimensional representation is a set of images in sequence of the interior region of the compartment, output by a computed tomography (CT) scanner, further wherein each image in the set of images has a width and a height, and when stacked together, form a depth.

11. The computing system of claim 9, wherein the trained neural network is trained by:
   calculating, by the processor, a maximum intensity projection across each dimension of at least two orthogonal projections of a known three-dimensional representation of a prohibited object;
   stacking, by the processor, each of the maximum intensity projections into a single image; and
   feeding, by the processor, the single image into the trained neural network so that the trained neural network learns that the single image having the same maximum intensity projections corresponds to the prohibited object.

12. The computing system of claim 11, wherein the trained neural network classifies the compartment into the first category in response to determining that a single image fed to the trained neural network calculated by the computing system from the three-dimensional representation of the compartment being scanned at the security checkpoint does not compare to previously classified single images of known prohibited objects known by the trained neural network.

13. The computing system of claim 11, wherein the trained neural network classifies the compartment into the second category in response to determining that a single image fed to the trained neural network calculated by the computing system from the three-dimensional representation of the compartment being scanned at the security checkpoint compares to previously classified single images of known prohibited objects known by the trained neural network.

14. The computing system of claim 11, wherein the calculating the maximum intensity projection across each dimension of at least two orthogonal projections of the three-dimensional representation includes:
   first calculating, by the processor, a maximum value of a projection in a Z dimension along an X, Y plane of the at least two orthogonal projections, for each pixel;
   second calculating, by the processor, a maximum value of a projection in a Y dimension along a X, Z plane of the at least two orthogonal projections, for each pixel; and
   third calculating, by the processor, a maximum value of a projection in an X dimension along a Y, Z plane of the at least two orthogonal projections, for each pixel.

15. The computing system of claim 9, wherein the trained neural network is a two-dimensional convolutional neural network (CNN) that classifies the compartment into the first category or the second category regardless of a shape or a material of an object contained within the compartment, without requiring human inspection of an output of the imaging device.

16. The computing system of claim 9, wherein the first category represents compartments that do not include a prohibited object based on an output of the trained neural network, and the second category represents compartments that do include a prohibited object based on the output of the trained neural network.

17. A computer program product, comprising a computer readable hardware storage device storing a computer readable program code, the computer readable program code comprising an algorithm that when executed by a computer processor of a computing system implements a method for automatically classifying compartments at a security checkpoint comprising:
   receiving, by the processor, a three-dimensional representation of a compartment from an imaging device connected to the computing system; and
   classifying, by the processor, the compartment into a first category or a second category using a trained neural network that analyzes the three-dimensional representation, regardless of a shape or a material of an object contained within the compartment, without requiring human inspection of an output of the imaging device, wherein compartments classified into the first category are automatically cleared at the security checkpoint and compartments classified into the second category undergo further security checks.

18. The computer program product of claim 17, wherein the trained neural network is trained by:
   calculating, by the processor, a maximum intensity projection across each dimension of at least two orthogonal projections of a known three-dimensional representation of a prohibited object;
   stacking, by the processor, each of the maximum intensity projections into a single image; and
   feeding, by the processor, the single image into the trained neural network so that the trained neural network learns that the single image having the same maximum intensity projections corresponds to the prohibited object.

19. The computer program product of claim 18, wherein:
   the trained neural network classifies the compartment into the first category in response to determining that a single image fed to the trained neural network calculated by the computing system from the three-dimensional representation of the compartment being scanned at the security checkpoint does not compare to previously classified single images of known prohibited objects known by the trained neural network; and
   the trained neural network classifies the compartment into the second category in response to determining that a single image fed to the trained neural network calculated by the computing system from the three-dimensional representation of the compartment being scanned at the security checkpoint compares to previously classified single images of known prohibited objects known by the trained neural network.

20. The computer program product of claim 18, wherein the calculating the maximum intensity projection across each dimension of at least two orthogonal projections of the three-dimensional representation includes:
   first calculating, by the processor, a maximum value of a projection in a Z dimension along an X, Y plane of the at least two orthogonal projections, for each pixel;
   second calculating, by the processor, a maximum value of a projection in a Y dimension along a X, Z plane of the at least two orthogonal projections, for each pixel; and
   third calculating, by the processor, a maximum value of a projection in an X dimension along a Y, Z plane of the at least two orthogonal projections, for each pixel.

* * * * *